3,052,008
Patented Sept. 4, 1962

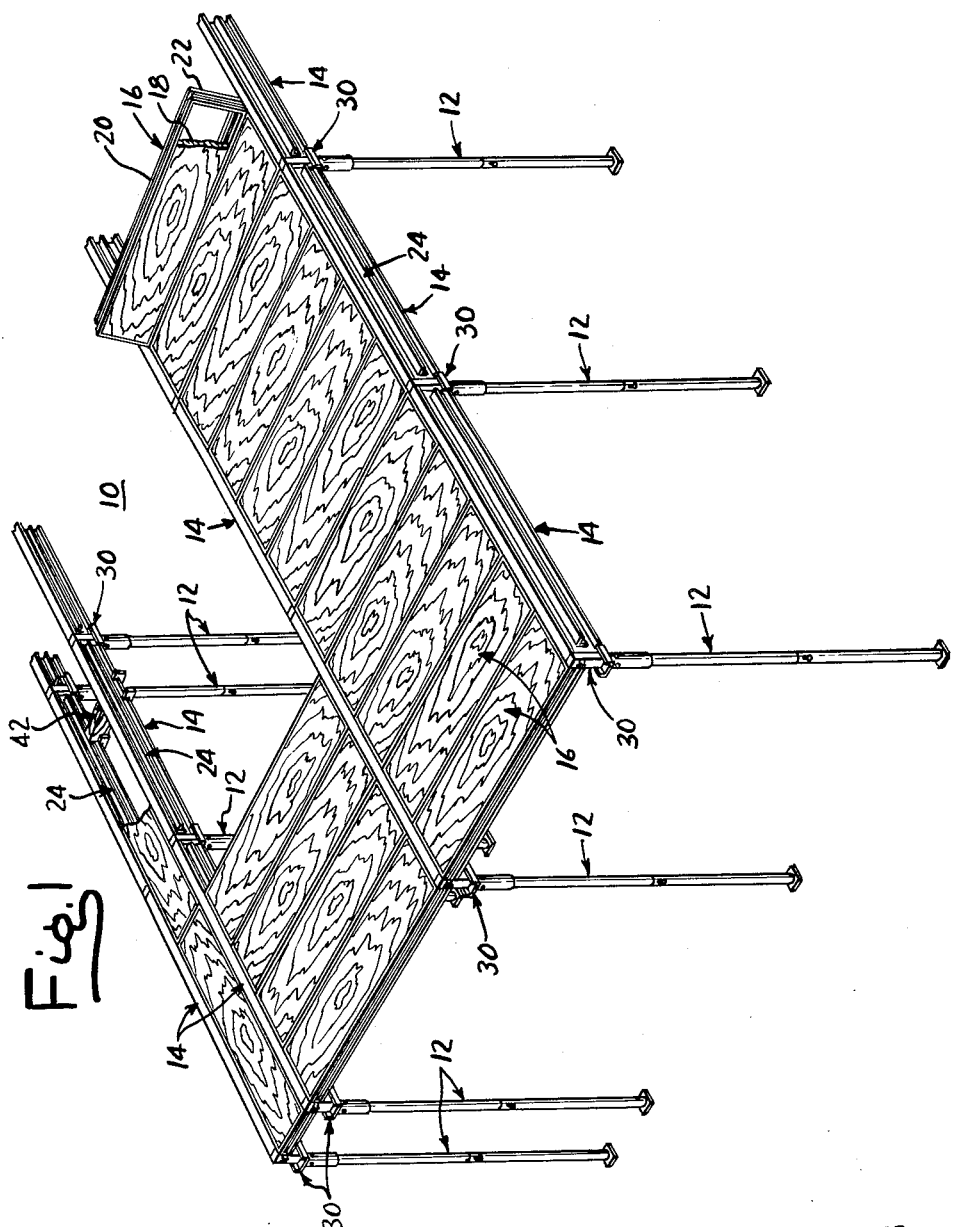

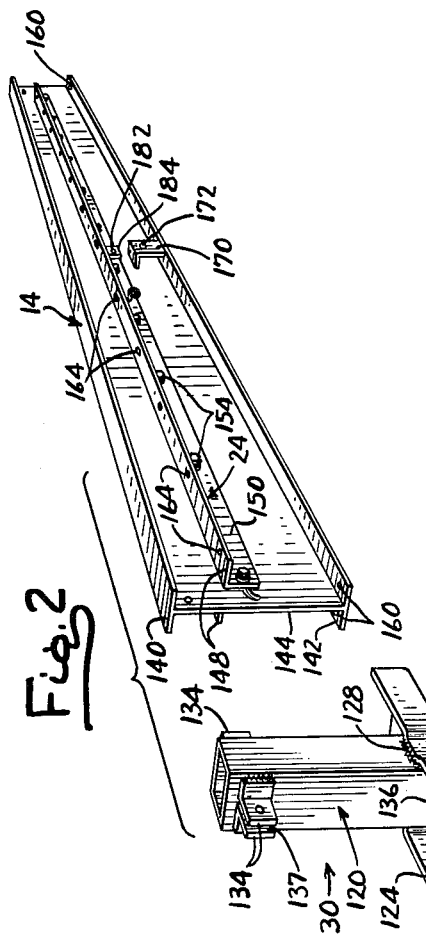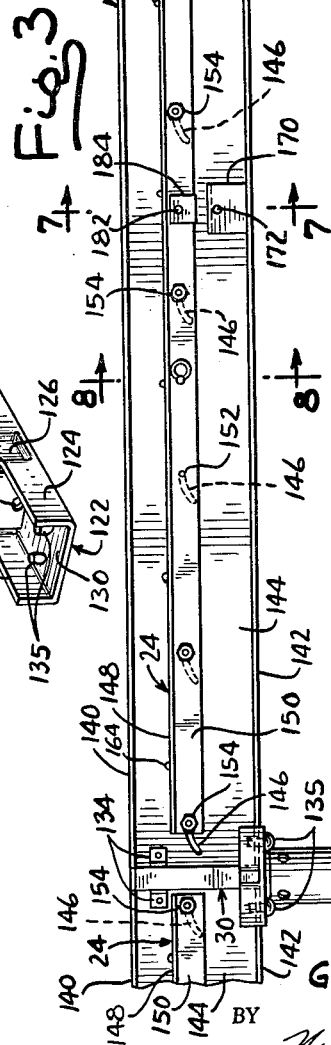

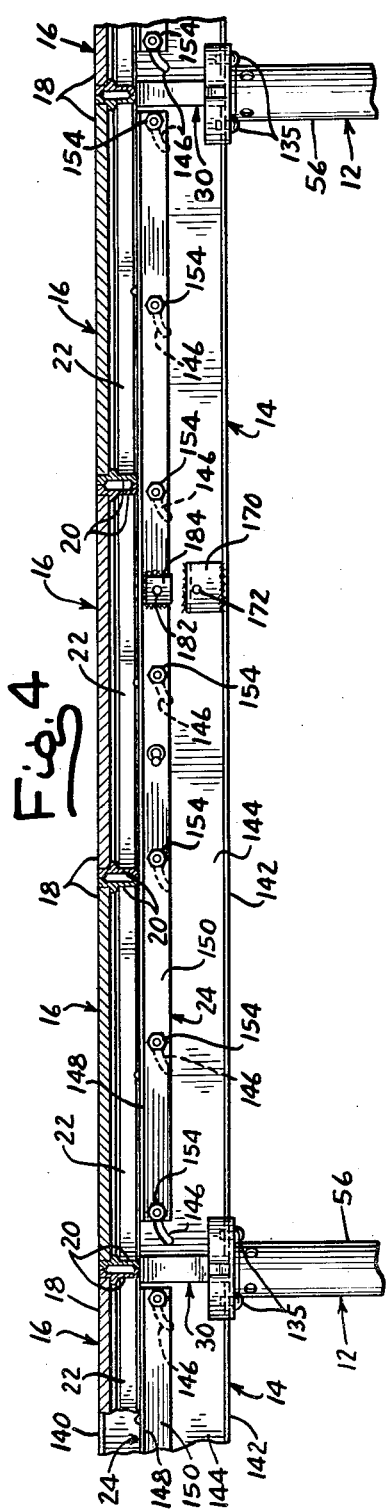
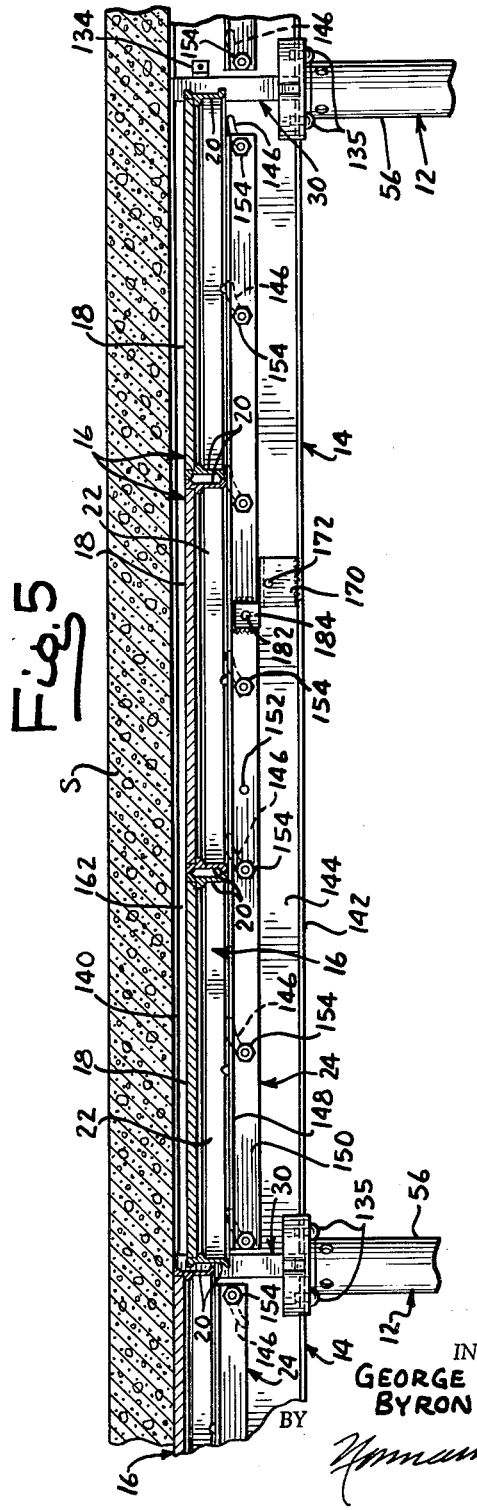

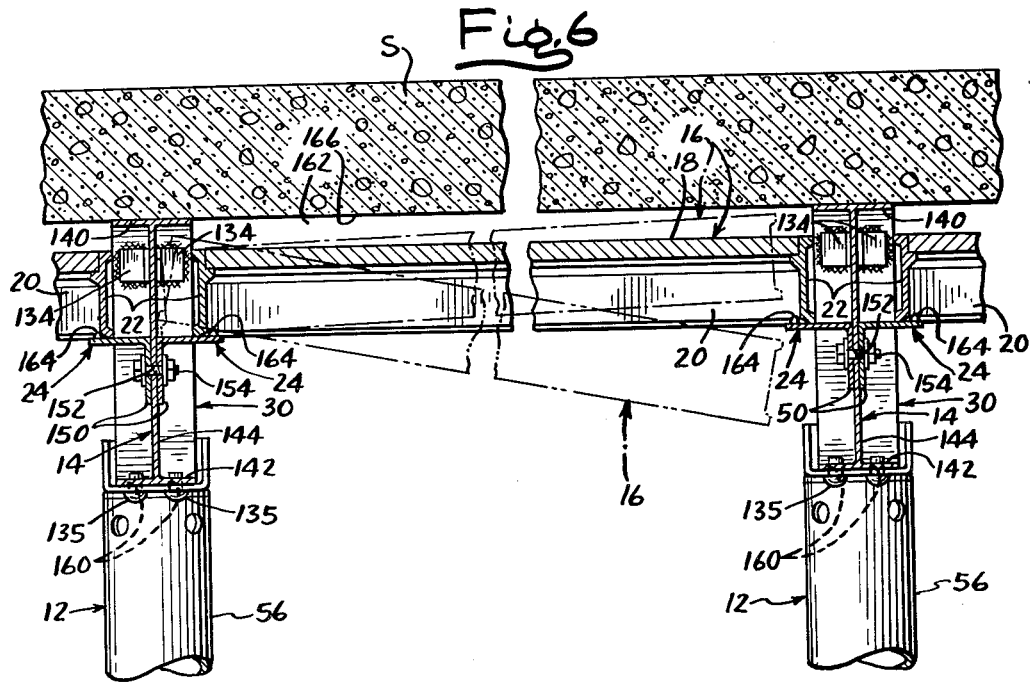
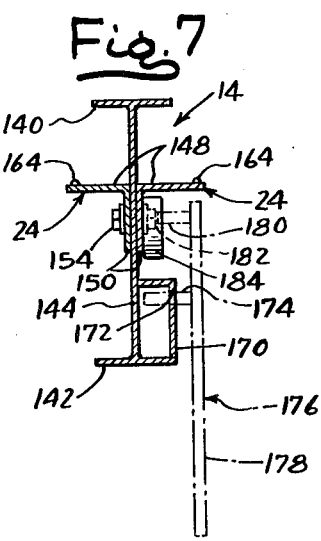
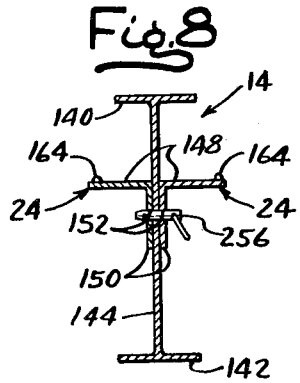
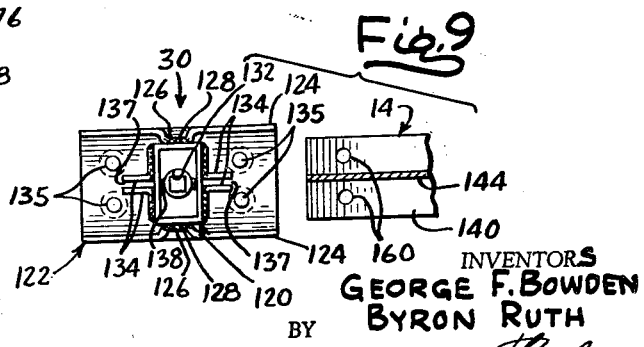

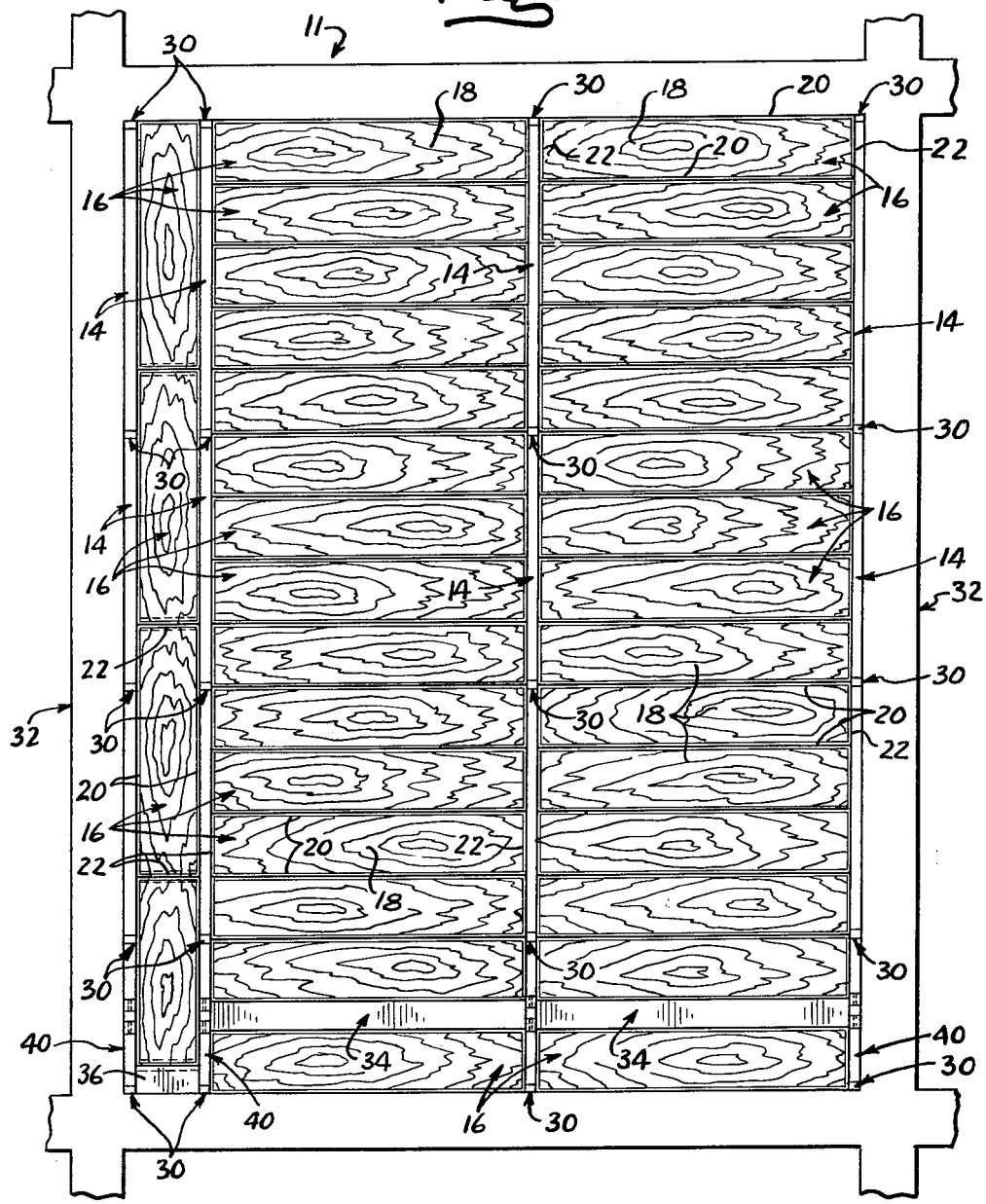

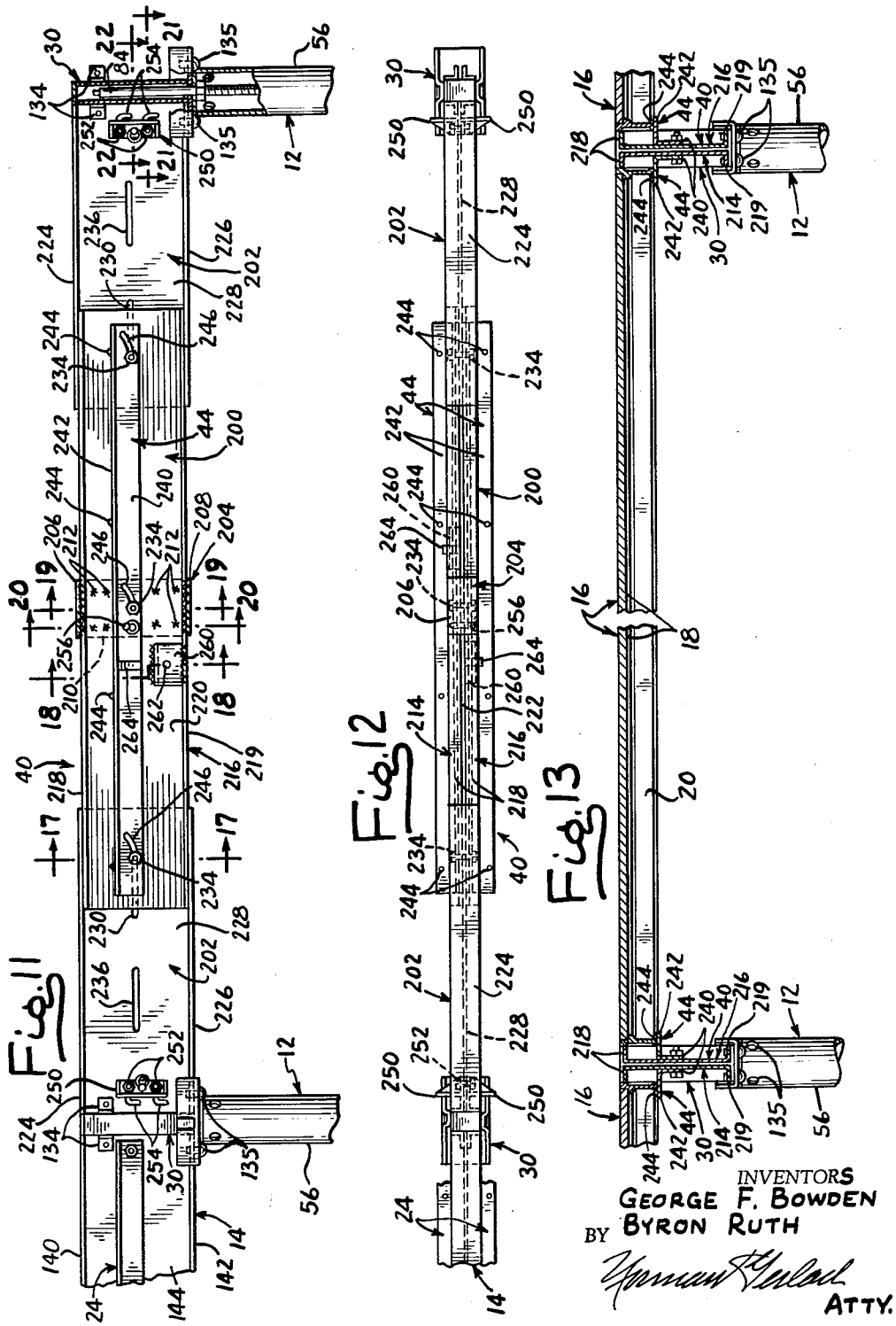

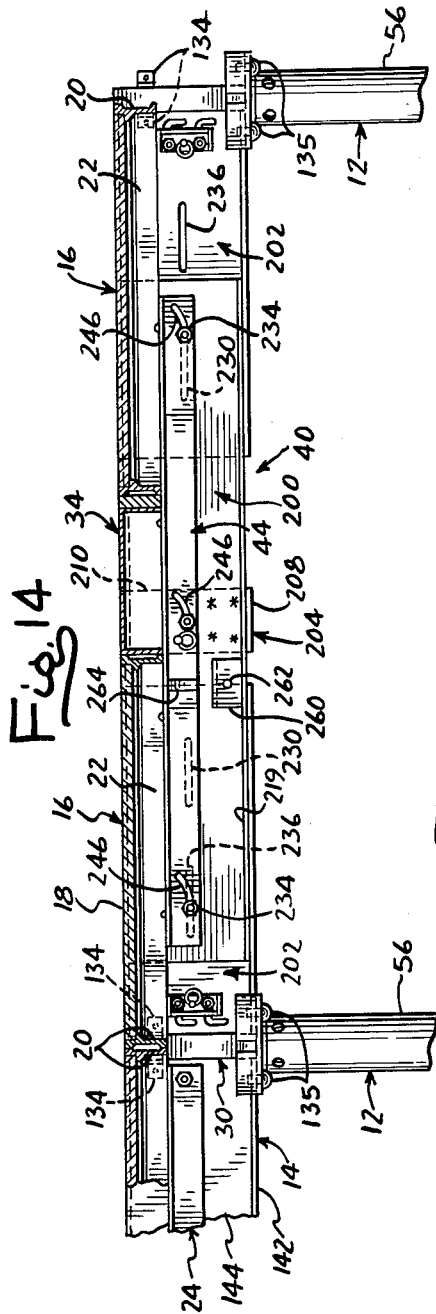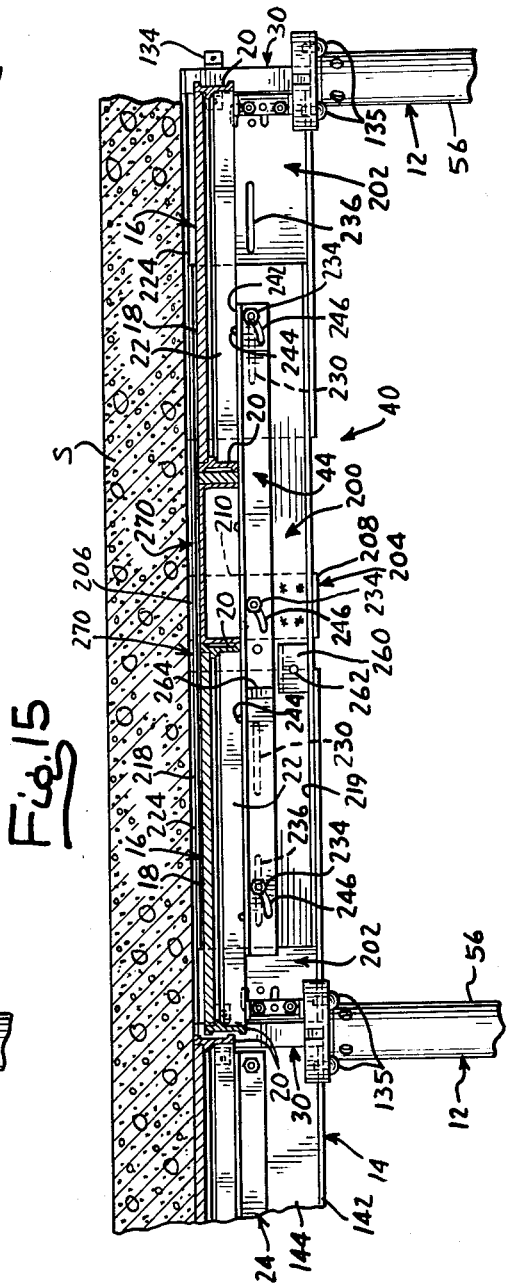

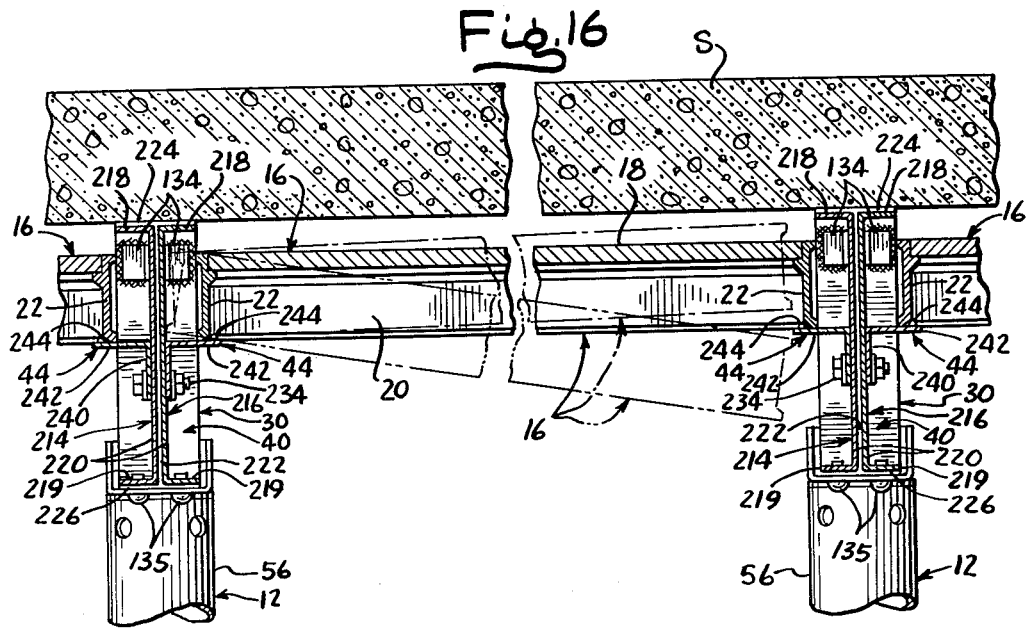
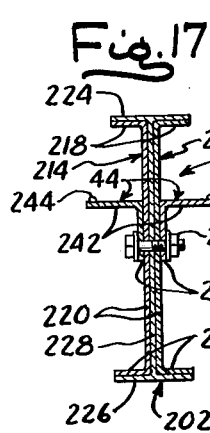
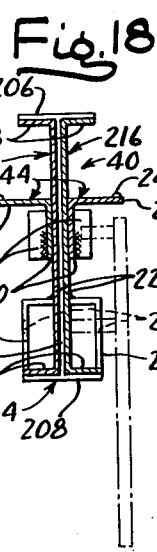
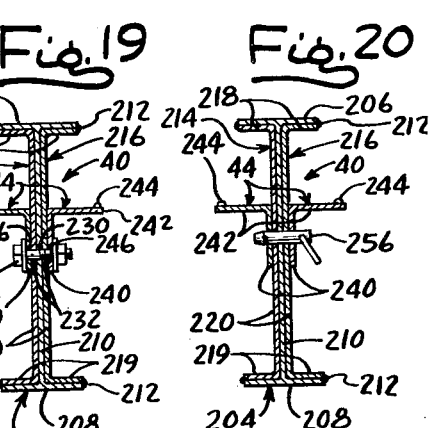
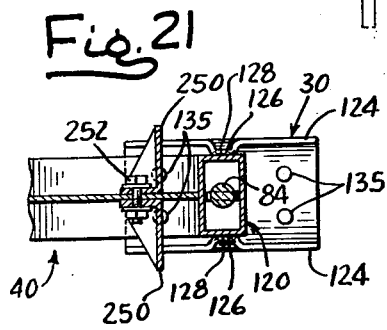

3,052,008
PANEL-SUPPORTING STRINGER ASSEMBLY FOR A CONCRETE FLOOR SLAB
George F. Bowden, Des Plaines, and Byron E. Ruth, Chicago, Ill., assignors to Symons Mfg. Company, a corporation of Delaware
Original application Jan. 24, 1961, Ser. No. 84,574. Divided and this application Aug. 16, 1961, Ser. No. 131,904
11 Claims. (Cl. 25—131.5)

The present invention relates to building construction and has particular reference to a novel stringer assembly which is designed for use in releasably supporting a series of panels in position in a concrete floor slab form installation preparatory to and during concrete pouring operations, as well as after the concrete has been poured and up until such time as the concrete has become sufficiently set that it is considered safe to remove the panels.

Stringers in accordance with the principles of the present invention are designed for use specifically with the system which is illustrated and described in our copending United States patent application Serial No. 84,574, filed on January 24, 1961, and entitled "Method of and Apparatus for Erecting Building Structures Having Concrete Floor Slabs," the present application being a division of said copending application.

The present stringers are so designed that, when employed in the system of our copending application, they make possible a novel shore-to-stringer connection by means of which the stringers are secured to the upper ends of the shores which support them. However, the stringers are not necessarily limited to use in connection with the system of our copending application and when used in other systems not employing the particular shore-to-stringer connection, other means may be provided for supporting them so that they may perform their intended purpose.

The principal object of the present invention is to provide a novel stringer assembly having associated therewith simple and novel means for effecting release of all of the slab-supporting panels supported thereby without the necessity of removing the stringer assembly from its supporting position with respect to the concrete slab which it directly supports. Stated otherwise, it is an object of the invention to provide a stringer assembly which, when operatively installed with like assemblies in a concrete form installation for producing a horizontal floor slab or similar structure, serves not only to support the panels upon whch the concrete is poured but also underlies and supports a limited portion of the slab itself. Thus, after the concrete has been poured upon the panels and has become sufficiently set that the support offered by the stringers alone will maintain the slab, the panels may be removed, leaving the stringers in position to support the slab until such time as the concrete has become fully set.

Heretofore, in the erection of concrete structures involving relatively massive, extensive, horizontally disposed concrete slabs, according to all known methods it has been the practice to arrange the form panels for the slab in edge-to-edge relationship with their end regions resting directly on top of the stringers so that the stringers completely underlie the panels. The stringers themselves are, of course, supported by suitable shoring members. It is obvious that with the horizontal stringers supported upon the upper ends of the vertical shore members, and with the form panels resting upon the stringers, after the concrete of the slab has been poured upon the upper surfaces of the panels, it is impossible to remove the panels without first taking down both the stringers and shoring members which support the panels.

The novel stringers of the present invention are so designed as to support the various form panels so that the upper faces of the panels are coplanar. These stringers, when in their operative panel-supporting position, present upper edge surfaces which are also coplanar with and constitute an extension of the form panels so that all of the panels and all of the stringers which support the panels, in combination with one another, present a substantially continuous horizontal unbroken or uninterrupted planar surface which constitutes the surface onto which the wet concrete is poured for slab-forming purposes. The adjacent ends of the form panels, instead of being supported upon the upper edges of the stringers as in conventional building erection methods, are supported upon bars which are movably carried on the sides of the stringers. The ends of the panels rest upon the upper edges of these bars and the bars are movable between elevated operative positions wherein they maintain the end edges of the panels in exact horizontal register with the top surfaces of the stringers and lowered positions wherein the vertical distance between the upper faces thereof and the upper faces of the stringer bodies is appreciably greater than the over-all thickness of the panels. Thus, in their lowered positions, in an operative installation with the panels resting thereon, the ends of these panels are free and, by proper manipulation of the panels, the same may be removed from beneath the poured and partially hardened slab, while, at the same time, the upper surfaces of the stringer bodies remain in place against the underneath side of the slab so that the latter remains supported during panel-removing operations. By such an arrangement, at no time is the supporting pressure exerted by the shoring members and stringers against the underneath face of the concrete slab relieved and, except for the necessary movement of the support bars for panel-releasing purposes, the shoring and stringers supported thereby remain undisturbed. In its broadest aspect, therefore, the invention contemplates the provision of a stringer assembly having means at the sides thereof for supporting the end regions of a series of panels and having an upper edge surface which, when the panels are supported from the sides of the stringer, lies flush with the panel facings so that the panels and stringers establish a continuous slab-supporting surface onto which the wet concrete is poured, together with means for dropping the side supports after the concrete has hardened to release the panels while allowing the stringers to remain in place and in their slab-supporting relationship.

Briefly, in a contemplated commercial embodiment of stringers embodying the present invention, the stringers are designed to accommodate the use of prefabricated panel units of the type which is shown and described in copending United States patent application Serial No. 854,967, filed on November 23, 1959, by George F. Bowden and entitled "Tie Rod Assembly for Concrete Wall Form Panels," now Patent No. 2,997,769. Such panel units are commonly known as "steel ply" panels. The various panel units are each in the form of a generally rectangular plywood facing having a marginal reinforcing frame including longitudinal and transverse frame bars which are formed of steel. The entire structure is generally in the form of a rectangular shallow tray, the bottom of which is the plywood facing and the sides of which are the marginal steel frame bars. The stringers for supporting these ply panels are generally in the form of I-beams. The web portion of each of the I-beams is provided on opposite sides thereof with vertically movable rails or support bars which, when in their uppermost or raised positions, are disposed below the top flange of the I-beam a distance precisely equal to the thickness of one of the steel ply panels. Thus, with the edges of the panels resting upon support bars and with the latter serving as shelves or supports, the plywood facings of the panels are in contiguity with the top flanges of the stringers so that the concrete may be poured over the panels and stringers which present a substantially smooth, unbroken, continuous, concrete-receiving surface. Locking means are provided for maintaining the support bars in their elevated positions. After the concrete has hardened, the locking means are released and the support bars are caused to drop through a distance of a few inches, whereupon the panels may readily be stripped from beneath the concrete while the top flanges of the stringers remain in their supporting relationship with respect to the concrete slab. In order to move the support bars between their lowered and their elevated positions, the bars and each stringer body upon which the bars are movably mounted are provided with respective reaction shoulders for cooperation with the effective fulcrum and operating point associated with a manually operable lever.

Steel ply panels of the type heretofore mentioned are constructed in standard sizes which vary both as to length and width. It frequently happens, therefore, that when all of the panels which cooperate to make up the slab form are arranged in edge-to-edge relationship to produce the surface upon which the concrete is poured, there will be an odd dimension, either longitudinal or transverse, or both, which odd dimension cannot be accommodated by the use of panels of standard size. Heretofore, these odd dimensions in a longitudinal direction with respect to the slab have been made up by the use of specially constructed panels or stringer filler pieces and, to make up for such odd dimensions insofar as the stringers are concerned, it has been necessary to cut the stringers to an exact length or, alternatively, to allow the ends of the stringers to project beyond the edges of the slab-forming surfaces in overhanging relationship with respect to the shoring.

Insofar as the panels themselves are concerned, it has been the practice to employ filler pieces at the ends of the stringers and these filler pieces must be carefully cut and fitted into place, thus consuming considerable time insofar as labor is concerned and utilizing costly materials. In order to make up an odd dimension transversely with respect to the slab, stringer cross-pieces are usually cut and fitted into place and held in position by special shores or fastened by brackets, braces, struts or the like. In short, the solution of the problem of accommodation of an odd dimension, whether the dimension be transversely of the slab or longitudinally thereof, is usually a matter of expediency and it involves the ingenuity of a carpenter in most instances with no standard practice being available and with only the materials at hand being available for the purpose.

Another and important aspect of the present invention resides in the manner in which the filling-in of odd dimensions, both longitudinal and transverse, may be accomplished without requiring special cutting and fitting operations, the use of special supporting shores, overhanging stringers or stringers which must be cut to dimension, and without the use of costly materials. Accordingly, the invention contemplates the provision of a novel adjustable stringer which, when an odd dimension in a longitudinal direction is encountered, may be put to use to support a series of fill-in panels which are preferably, but not necessarily, disposed at an end region of the slab. Such adjustable stringers are of a sectional nature and are longitudinally extensible and contractible to the extent necessary to accommodate the supporting of the ends of any filler panels or fill-in pieces which may be used to make up the odd dimension. The adjustable stringers have associated therewith the previously mentioned vertically shiftable support bars and the design of the stringers is such that dual-purpose clamping devices serve the function, first, of clamping the stringer sections together in their extended positions of adjustment and, secondly, of clamping the support bars in their raised panel-supporting positions. When released, the clamping devices allow the support bars to move to their lowered positions for panel-releasing purposes, and, although the stringer sections are released for potential elongation or contraction of the stringer as a whole, the previously mentioned interlocking connections between the ends of the stringers and the shore members which support them serve to hold the adjustable stringers in place against dislodgment, elongation or contraction.

A further feature offered by the stringers of the present invention resides in the provision of a novel form of panel-locking means whereby, once the panels are positioned on the stringers, they are self-locking with respect to the latter and remain locked thereto against dislodgment until such time as they are manually lifted from the stringer assemblies so that the hazard of falling panels is reduced to a minimum.

Numerous other objects and advantages of the invention, not at this time enumerated, will become readily apparent as the following description ensues.

In the accompanying eight sheets of drawings forming a part of this specification:

FIG. 1 is a fragmentary perspective view of a typical concrete installation involving the formation of a horizontally disposed concrete slab and showing operatively applied thereto a number of non-adjustable stringers embodying the present invention;

FIG. 2 is an enlarged exploded perspective view showing a non-adjustable stringer according to the present invention juxtapositioned with respect to an adjacent shore assembly preparatory to assembly thereon;

FIG. 3 is a fragmentary side elevational view of a series of aligned non-adjustable stringers and showing the same operatively connected to the upper ends of a pair of shores by means of the shore-to-stringer connection that is shown in FIG. 2;

FIG. 4 is a fragmentary side elevational view similar to FIG. 3 but showing the panels operatively installed in position on the supporting stringers;

FIG. 5 is a fragmentary side elevational view similar to FIGS. 3 and 4 but after the concrete slab has been poured, and showing certain of the panels released for seubsequent removal from the installation;

FIG. 6 is an enlarged fragmentary sectional view, somewhat schematic in its representation, illustrating the manner in which the form panels are removed from the installation;

FIG. 7 is an enlarged sectional view taken on the line 7—7 of FIG. 3 in the direction indicated by the arrows;

FIG. 8 is an enlarged sectional view taken on the line 8—8 of FIG. 3 in the direction indicated by the arrows;

FIG. 9 is a fragmentary exploded top plan view illustrating the manner in which a shore and stringer are operatively assembled upon each other;

FIG. 10 is a top plan view of a typical concrete installation involving the formation of a horizontally disposed concrete slab and showing a number of adjustable stringers constructed according to the present invention operatively applied thereto;

FIG. 11 is a side elevational view similar to FIG. 3 but showing an adjustable stringer constructed in accordance with the principles of the present invention;

FIG. 12 is a top plan view of the structure of FIG. 11;

FIG. 13 is an end elevational view of the structure of FIG. 11;

FIG. 14 is a fragmentary side elevational view, partly in section and similar to FIG. 11, showing the panels operatively installed in position on the supporting stringers;

FIG. 15 is a side elevational view similar to FIG. 14 but after the concrete slab has been poured;

FIG. 16 is a sectional view similar to FIG. 6 and schematically illustrating the manner in which the form panels are removed from their installed position between adjacent adjustable stringers;

FIG. 17 is a sectional view taken on the line 17—17 of FIG. 11 in the direction indicated by the arrows;

FIG. 18 is a sectional view taken on the line 18—18 of FIG. 11 in the direction indicated by the arrows.

FIG. 19 is a sectional view taken on the line 19—19 of FIG. 11;

FIG. 20 is a sectional view taken on the line 20—20 of FIG. 11;

FIG. 21 is a sectional view taken on the line 21—21 of FIG. 11 in the direction indicated by the arrows; and FIG. 22 is a sectional view taken on the line 22—22 of FIG. 11 in the direction indicated by the arrows.

Referring now to the drawings in detail and in particular to FIG. 1, there has been disclosed in this view a typical installation involving the supporting surface for a concrete slab S, such as the slab shown in FIGS. 6, 14 and 15, and resulting from the pouring of concrete on the supporting surface. The entire installation has been designated in its entirety at 10 and it involves a series of vertically disposed shore assemblies 12, which will hereinafter be referred to simply as shores. The upper ends of these shores 12 serve to support a series of longitudinally extending stringers 14 embodying the present invention, and such stringers, in turn, support a series of transversely disposed form panel units 16, the end edge regions of which are supported by the stringers. For brevity, the units 16 will hereafter be referred to as panels. The slab S, which does not appear in FIG. 1 but which appears fragmentarily in other views, such as FIGS. 13 and 14, for example, may constitute the first poured lowermost slab of a series of superimposed slabs subsequently to be poured in a multi-story building installation, the various slabs S forming the bases for the floor and ceiling installations of the building. In such a case, the shores 12 will be set up in the usual manner of shore installation on mud sills or ledgers (not shown) which are positioned upon the ground or other supporting foundation surface and serve to prelocate the vertically disposed shores. If the supporting surface represented by the upper faces of the panels 16 is for the purpose of receiving poured concrete to produce one of the upper superimposed slabs, then the ledgers will be installed on previously formed slabs. It will be understood that the various shores 12 may be cross-braced in any suitable manner by struts or the like, such cross-bracing being omitted herein since it forms no part of the present invention.

The installation 10 is merely illustrative of a typical installation in which the shores 12 are arranged in four spaced apart, longitudinally extending rows and with the panels 16 having their own longitudinal direction extending transversely of the installation 10 between the adjacent parallel stringers 14. The panels 16 in the illustrated form are conventional steel ply panel units of the type which is shown and described in aforementioned patent application Serial No. 854,967, and no claim is made herein to any novelty in such units. Said panels 16 are in the form of shallow rectangular box-like structures of tray-like design. Each panel includes a plywood facing 18 which is bounded by marginal steel frame members including elongated side members 20 and end members 22. Steel ply panels of this general character are made up in standard sizes, specifically in three, four, six and eight-foot lengths, and in one, one and one-half, two, four, six, eight, ten, twelve, fourteen, sixteen, eighteen, twenty and twenty-four inch widths, any combination of such lengths and widths being available.

For purpose of description herein, both in the specification and the claims appended hereto, and in the interests of clarity, the direction of extent of the stringers 14 will be considered to be the longitudinal direction of the slab S and of the installation on which it is formed, while the elongated direction of the panels 16, i.e., the direction of their length, will be considered as the transverse direction of the slab and its supporting structure. Directions concerning the slab or supporting structure, therefore, will be referred to either as longitudinal or transverse, while directions concerning the individual panels 16 will be referred to in terms of the long and short dimensions, respectively, of the panel.

It will be observed that the supporting surface for the slab S is made up of two series of full length panels of equal width arranged in contiguity with their long edges abutting one another. On the far side of the installation, as viewed in FIG. 1, there is a small odd dimension which has been made up by the use of a series of the panels 16 positioned with their long edge regions resting on the stringers 14 and with their short edges abutting. The odd dimension selected for illustration herein has for convenience been shown as being equal to a panel width but it will be understood that greater or lesser odd dimensions may be made up by the use of wider or narrower panels in any of the standard sizes in which the panels are manufactured. If necessary, where fractions of an inch are concerned, pieces of lumber may be cut and fitted as to size so as to serve in place of the prefabricated panels 16.

The basic arrangements of parts thus far described, without regard to any specific form of shoring, of stringers or of panels, is more or less conventional in that in the erection of a building construction involving superimposed slabs, the slab foundation is almost invariably comprised of contiguously arranged panels supported upon stringers which are, in turn, supported upon shoring, the general arrangement and disposition being substantially the same as that illustrated in FIG. 1. It is to be noted, however, that, as will be described in greater detail presently, the upper concrete-receiving faces of the plywood facings 18 of the various panels 16 lie substantially flush with the upper edge faces of the stringers 14 so that these upper edge surfaces of the stringers constitute a limited portion of the slab-supporting surface as a whole. In other words, the ends of the panels 16 do not rest directly upon the upper edges of the stringers as in conventional installations but lie flush with these surfaces so that adjacent ends of the panels are separated from each other by an intervening portion of a stringer 14. As will become clear presently, the end regions of the various panels 16 are supported upon vertically shiftable rails or support bars 24 which are movably mounted on the sides of the stringers and which may be locked in raised positions so that the panel facings lie flush with the upper edges of the stringers. The support bars 24 are capable of being released or lowered, in which case the panels are free to be withdrawn from the underneath side of the hardened slab, while the stringers remain in their supporting relationship with respect to the portions of the slab which they underlie. Therein lies one of the principal features of the present invention.

Still referring to FIG. 1, at the upper end of each shore 12, there is a shore-to-stringer connection in the form of a bracket 30. The latter serves to maintain the adjacent ends of a pair of the stringers 14 in supported and aligned relationship. The relationship of the shore brackets 30 with respect to the stringers 14 will be set forth in greater detail hereafter. The shore brackets 30 constitutes functional part of the shores 12. Reference may be had to such application for a full disclosure of the design, construction and mode of operation of the shores 12 and the brackets 30 but, for purposes of this specification, only such details of the shore brackets 30 as relate specifically to the stringer-to-shore connections will be described.

It frequently happens that it is necessary to make up an odd dimension in a longitudinal direction relative to the slab, as for example, when an installation, such as has been illustrated in FIG. 10, is made within the rectangular confines of a preformed concrete beam structure 32. In such a case, the odd dimension in a longitudinal direction with respect to the slab may be made up by the use of a pair of narrow filler panels 34, each of which lies within a longitudinally extending row of the panels 16 and also by a judicious selection of panel sizes in the row of panels at the left-hand side of FIG. 10 where an odd dimension transversely of the slab is accommodated in a manner similar to that disclosed in connection with FIG. 1. It is to be noted that the odd dimension which occasioned the use of the filler panels 34 necessitates the use of a relatively narrow filler panel 36 in the left-hand row of the filler panels which are shown in FIG. 10.

The stringers 14 are made up in standard lengths and, therefore, the odd dimension represented by the filler panels 34 cannot be accommodated by the fixed length stringers 14. According to the present system, this odd dimension in a longitudinal direction may be accommodated by the use of adjustable length stringers such as have been shown at 40 (see FIGS. 11 to 15, inclusive). A detailed description of these adjustable length stringers will be made presently. As is the case in connection with the previously mentioned fixed length stringers 14, the adjustable length stringers 40 have associated therewith vertically movable support bars 44 (see FIG. 11). Such support bars are similar to the support bars 24 and serve releasably to support the various panels 16, 34, 36 or any fill-in pieces which may be employed in making up the slab-supporting surface.

The details of the shore assemblies 12 have not been fully disclosed herein. Briefly, however, each shore 12 includes an adjustable base part which is comprised of telescopic tubular sections 54 and 56. The section 56 is located above the section 54 and serves to support the previously mentioned shore bracket 30. The tubular section 54 carries a fixed elevation screw 84 which projects upwardly into the shore bracket 30 (see FIG. 11) and passes through a nut 96. The latter is welded to the tubular upper section 56 so that, upon turning movement of the section 56 relatively to the section 54, the overall height or vertical extent of the shore 12 may be varied.

Each shore bracket 30 involves in its general organization an open-ended tubular body 120, the lower end of which is seated within the confines of a short section 122 of channel stock. The sides 124 of the channel type section 122 straddle the lower end of the tubular body 120 and the medial regions of the sides are pressed inwardly as at 126 and are welded as at 128 to the opposite sides of the body 120. The lower open end of the body 120 seats squarely on the bottom or base 130 of the section 122. The base 130 has associated therewith a pair of rivets 135, the head portions of which underlie the base and are welded thereto, and the shank portions of which project upwardly through said base. The upwardly projecting shank portions of the rivets serve as locating pins for attachment of a pair of the longitudinally extending stringers 14. The front and rear sides of the tubular body 120 have welded thereto pairs of small angle pieces 134 with the pieces of each pair being arranged in spaced relationship to define therebetween a stringer-receiving slot 137, the function of which will be apparent when the nature of the stringer 14 is better understood.

One of the non-adjustable stringers 14 is shown in detail in FIG. 2 and it includes a body portion in the form of an I-beam having upper and lower horizontal flanges 140 and 142 and an interconnecting vertical web 144. The web 144 is provided with a series of arcuate slots 146, the latter being located at spaced regions longitudinally of the I-beam. On opposite sides of the web 144 and in straddling relationship with respect to said web, are two of the previously mentioned movable support bars 24. Each support bar 24 is in the form of an angle piece consisting of a horizontal flange 148 and a vertical flange 150. The flange 148 projects outwardly beyond the lateral extent of the I-beam flanges 140 and 142. The vertical flange 150 of each support bar is provided with a series of spaced holes 152 (see FIGS. 6 and 8), each hole being designed for registry with one of the slots 146. Clamping nut and bolt assemblies 154 pass through the registering holes 152 and slots 146 and are provided for the purpose of clamping the support bars 24 hard against the sides of the web 144 in either an elevated operative panel-supporting position or in a lowered panel-releasing position. The various arcuate slots 146 are so formed in the web 144 of the I-beam that they afford an upgrade rise along which the clamping nut and bolt assemblies 154 may be slid to carry the support bars between their upper and its lower positions.

Near the ends of each stringer 14, the lower horizontal flange 142 is provided with a pair of holes 160 (see FIGS. 2 and 9), the holes of each pair being disposed on the opposite sides of the web 144. These holes 160 are adapted to receive therein the upwardly extending shank portions of the rivets 135 in order to lock the ends of the stringers in a supported position on the shore bracket 30. The rivets 135 and the holes 160 serve to maintain adjacent ends of adjacent stringers in longitudinal alignment. With each end of the stringer thus supported upon the base part of a bracket 30, the web 144 of the stringer is confined within the slots 137 between adjacent pairs of angle pieces 134 to stabilize the stringer and prevent angular tilting thereof.

It is to be observed that with a given stringer 14 operatively supported at its ends on respective shore brackets 30, and with the latter operatively positioned on the upper ends respective shores and, furthermore, with the nut and bolt assemblies 154 disposed within their respective slots 146 at the extreme upper ends of the slots, the upper edges of the various panels 16 will lie flush against the top flanges 140 of the stringer 14. Stated otherwise, with each support bar 24 in its upper position, the distance between its horizontal flange 148 and the upper horizontal top flange 140 of the associated stringer 14 is equal to the over-all thickness of one of the panels 16 so that with the panel resting upon the horizontal flange 148, its upper edge surface will lie flush with the upper face of the top flange 140. When the nut and bolt assemblies 154 are disposed in their lowermost positions within the slots 14, each support bar 24 will be lowered bodily to such an extent that its horizontal flange 148 will be spaced below the top flange 140 of the associated stringer 14 an appreciable distance so that the panel 16 which is supported upon the flange 148 will be released for subsequent removal by the manipulation procedure which is schematically illustrated in FIG. 6 and is described hereafter.

As shown in FIGS. 6, 7 and 8 of the drawings, the horizontal flanges 148 of support bars 24 are provided with series of longitudinally spaced and aligned upstanding protuberances 164. The latter are of small height and are spaced outwardly from the webs 144 a sufficient distance that when the end regions of the various panels 16 are supported upon the support bars 24, the lower edges of the end members 22 of the panels 16 will seat upon the flanges 148 and lie behind the protuberances 164 to prevent endwise shifting movement of the panels when the support bars 24 are in their lowered or upper position. These protuberances 164 are provided as a precautionary safety measure to prevent accidental dislodgment of panels when the support bars are in their lowered or upper positions since at this time, as clearly shown in FIG. 6, the distance between the webs 144 of adjacent parallel stringers 14 is greater than the over-all length of a panel, the excess distance being sufficiently great as to permit dropping of a panel under certain circumstances. The protuberances 164 also serve to center the panels between the two webs so that when the support bars 24 are raised with the panels resting thereon, the latter will move vertically into contiguity with the top flanges 140 of adjacent stringers.

Panel removal operations may best be described in connection with FIG. 6 wherein the support bars 24 are shown as being in their lowered position, i.e., down. In the down position of the support bars, due to the clearance 162 between the panel facings 18 and the underneath surface 166 of the previously poured concrete slab S, the panels 16 are free to the extent that they may be shifted endwise in either direction preparatory to removal operations. When the support bars 24 are in their raised position, i.e., up, the panels 16 are compressed between the slab S and the horizontal flanges 148 of the support bars 24. They are also confined between the top flanges 140 of adjacent longitudinally extending stringers 14 so that the panels are securely locked against dislodgment in any direction.

With the various support bars 24 down, as shown in FIG. 6, in order to remove a panel, it is merely necessary to shift the panel endwise from its centered position shown in full lines in this view to the dotted line position thereof wherein one end of the panel abuts against one of the webs 144 of the two stringers between which the panel is positioned. To thus remove the panel, it is necessary to elevate the opposite end thereof slightly so that it will clear the protuberances 164. In the dotted line position of the panel 16, the right-hand end of the panel, as viewed in FIG. 6, lies to the left of the vertical plane of the adjacent free edge of the horizontal flange 148 so that by lowering the right-hand edge of the panel to the broken line position illustrated in this view, this end of the panel will clear such edge and the panel may be pulled out from beneath the slab S.

During such panel-removing operations, the stringers 14 remain in their supporting position with respect to the slab with the latter resting upon the top flanges 140 thereof so that at no time is the supporting pressure on the slab relieved except in the limited area where the panels are removed. Because of this fact, it is possible to resort to panel-removal operations at a comparatively early date after concrete pouring operations have been effected since it is not necessary to wait until the concrete has attained sufficient strength to be self-supporting between stringers twice removed from one another.

Mechanical means are provided for manually effecting movement of the various support bars 24 between their raised and lowered positions. Accordingly, each stringer 14 has welded or otherwise secured to it in the medial regions thereof, and adjacent to the bottom flange 142, an angle piece 170. The latter is provided with a hole 172 for reception therethrough of the fulcrum pin 174 of a tool 176 including an operating bar 178. The bar 178 carries a second pin 180 which is spaced from the fulcrum pin 174 and is designed for reception in a hole 182 in a second angle piece 184 which is secured in any suitable manner as by welding to the vertical flange 150 of the associated support bar 24 in the medial regions thereof. As shown in FIG. 7, by inserting the fulcrum pin 174 in the hole 172 and the operating pin 180 in the hole 182, the operating bar 178 may be swung in one direction or the other to apply force to the support bar 24 and shift the same between its two extreme positions. Each support bar may be secured or clamped in its raised position by tightening the nut and bolt assemblies 154.

Referring to FIG. 2, it has been previously set forth how in certain instances it is necessary to make up an odd dimension longitudinally of the slab S and this may be accomplished by the judicious selection of filler panels, such as the panels 34, whose short dimensions are commensurate with the odd dimension to be made up. It is obvious that when an odd dimension of this sort creates a problem, it is necessary to lend various rows of panels extending longitudinally of the slab. In other words, the ends of each panel must find support upon the stringers 14 and since the stringers are made in standard lengths, the odd dimension must be made up not only by the use of filler panels, such as the panels 34, but by additional stringer supporting areas to accommodate the filler panels. Accordingly, the adjustable stringer which is illustrated in FIGS. 11 to 22, inclusive, has been devised. Each adjustable stringer 40 is in the form of a composite sectional I-beam and involves in its general organization an assembly of parts which cooperate to make up a composite medial body section 200 from which there is longitudinally extensible at the ends thereof a pair of end sections 202, the two end sections being substantially identical so that a description of one of them will suffice for the other. The medial body section 200 is comprised of a short length 204 of I-beam stock having a top flange 206, a bottom flange 208, and an interconnecting web 210. Welded as at 212 (see FIG. 19) to the web 210 are two channel sections 214 and 216, each having top and bottom side flanges 218 and 219 and a channel web 220. The channel sections 214 and 216 are coextensive with each other and extend outwardly beyond the ends of the short length 204 an appreciable distance and define therebetween on opposite sides of said short length a narrow slot 222 (see FIG. 18), within which there is longitudinally slidable and adjustable one of the end sections 202.

Each end section 202 is in the form of a length of I-beam stock having an upper horizontal flange 224, a lower horizontal flange 226, and an interconnecting web 228. The web 228 is slidably received within the slot 222 and the bottom flange 226 extends outwardly in opposite directions and underlies the two bottom flanges 219 of the channel sections 214 and 216, as shown in FIG. 17. The upper flange 225 of each end section 202 extends outwardly in opposite directions and overlies the top side flanges 218 of the channel sections 214 and 216. To retain the end sections 202 in their assembled position upon the medial body section 200, the web 228 of each end section 202 is provided with a longitudinally extending elongated slot 230 (see FIG. 19), this slot being designed for registry with a hole 232 in the web 220. A nut and bolt assembly 234 extends through the slot 230 and the hole 232 and, when tightened, serves to draw the two webs 220 together in order securely to clamp the web 228 therebetween and thus clamp the end section 202 as a whole in any desired position of longitudinal adjustment with respect to the medial body section 200. A second longitudinally extending elongated slot 236 is formed in the web 228 and is spaced from the slot 230. The slot 236 is aligned with the slot 230 and it is designed for the same purpose, i.e., registry with the hole 232. These slots 230 and 236 may be selectively employed for registry with the hole 232 to effect a basic coarse adjustment of the over-all extent of the adjustable stringer 40, while the clamping nut and bolt assembly 234 is employed for effecting a fine adjustment of the parts. By utilizing various combinations of the slots 230 and 236, it is obvious that four ranges of adjustment as to stringer length may be effected, the shortest range being in effect when both slots 236 are employed. The vertically movable support bars 44 which are associated with each adjustable stringer 40 are similar in design to the vertically movable support bars 24 which are associated with each nonadjustable stringer 14 and they are substantially identical in their function. As best shown in FIGS. 11 and 12, each support bar 44 is in the form of a length of angle stock having a vertical flange 240 and a horizontal flange 242. The horizontal flange 242 is provided with a series of longitudinally spaced and aligned upwardly projecting protuberances 244 which are similar to the protuberances 164 and are designed for the same purpose, namely, to center the various panels 16 in position between adjacent spaced longitudinally extending stringers 40. The vertical flange 240 of each support bar 44 is formed with a series of longitudinally spaced arcuate slots 246 which are similar in function to the slots 146 in the support bars 24, but reversed as to their direction of curvature. The two support bars 44 are disposed on opposite sides of the medial body section 200 and the various nut and bolt assemblies 234 pass through respective slots 246 so that when these nut and bolt assemblies are tightened, the support bars 44 are drawn hard against the sides of the stringer body in clamping relationship. The nut and bolt assemblies 234 thus serve the dual function, first, of clamping the various sections 200, 202 of the stringer in positions of longitudinal adjustment, and secondly, of clamping the support bars 44 in their raised operative panel-supporting positions.

The outer or free ends of the stringer sections 202 are designed for cooperation with the shore brackets 30 in a manner substantially identical with the cooperation between the ends of the stringers 14 and these shore brackets so that it is deemed unnecessary to enter into a detail description of the stringer-to-shore connection. The connections at opposite ends of the stringer serve to maintain the stringer securely supported on the shore brackets 30 even when the clamping nut and bolt assemblies 234 are loosened for support bar-dropping operations.

As shown in FIG. 11, the ends of each support bar 44 terminate short of the ends of the two channel sections 214 and 216 so that it is necessary to support the ends of any panel units 16 which may overhang these support bars. Accordingly, a small angle support 250 is provided on opposite sides of the web 228 and it has associated therewith a pair of nut and bolt assemblies 252 which pass through angle slots 254 in the web 228. The nut and bolt assemblies 252 are slidable in the slots 254 between raised and lowered positions corresponding to the raised and lowered positions of the support bars 44. When the angle support 250 is in its raised position, as shown in FIG. 11, the upper edge thereof is flush with the flange 42 of the support bar so that a panel may bridge the distance between the adjacent end of the support bar and the angle support 250 thus to securely support the panel in its operative relationship with respect to the remaining panels in the series.

As a safety measure, a fast pin 256 is adapted to be passed through registering holes in the support bars 44 and in the webs 220 of the two channel sections 214 and 216 to maintain the support bar in its raised position. After loosening of the nut and bolt assemblies 234, it is necessary to remove the fast pin 256 before the support bars 44 can be lowered.

In order to facilitate movement of the support bar 44 between its raised and lowered positions, an angle piece 260 similar to the previously described angle piece 170 is provided with a hole 262 for cooperation with the fulcrum pin 174 (see FIGS. 11 and 23) of the tool 176. The operating pin 180 of the tool is designed for selective cooperation with the opposite sides of a shoulder-forming abutment 264 which is welded or otherwise secured to the vertical flange 240 of the support bar 44. When the support bar as a whole is urged in one direction, for example, to the left, as viewed in FIG. 19, the arcuate slots 246, cooperating with the nut and bolt assemblies 234, will cause the support bar 44 to be lowered. When the support bar is urged in the opposite direction, i.e., to the right, the cooperation between the arcuate slots and the nut and bolt assemblies 234 will cause the support bar 44 to be elevated.

The manner of removing the panels 16 from between adjacent nonadjustable stringers 14 and from beneath the concrete slab S has been illustrated in FIG. 16. The procedure followed is susbtantially the same as that followed in connection with the removal of panels from the nonadjustable stringers 14, as illustrated in FIG. 14. After the nut and bolt asemblies 234 have been loosened and the fast pin 256 withdrawn from its locking position, the support bars 44 are removed to their lowered positions, as shown in FIG. 16. The various panels 16 will, if properly lubricated, move downwardly with the support bars 44 and assume the full line position illustrated. The panels are thus free to the extent that they may be shifted endwise in either direction preparatory to removal operations. With the support bars 44 down, in order to remove a panel, it is merely necessary to shift the same endwise from its centered position to the dotted line position therof wherein one end of the panel abuts against the channel section 216. Before the panels 16 and be moved to its dotted line position, it is necessary to elevate the opposite end thereof slightly so that it will clear the protruberances 244. In the dotted line position of the panel 16, the right-hand end of the same, as viewed in FIG. 16, lies to the left of the vertical plane of the adjacent free edge of the horizontal flange 242 so that by lowering the right-hand edge of the panel to the broken line position illustrated in this view, this end of the panel will clear such edge and the panel may be pulled out from beneath the slab S. As is the case in connection with the nonadjustable stringer 14, so in the present instance during panel-removing operations, the stringers 40 remain in their supporting position with respect to the slab S with the latter resting upon the top flanges 206 of the short lengths 204, and also upon the upper flanges 224 of the end sections 202 so that at no time is the supporting pressure upon the slab relieved except in the limited area where the panels are removed.

Referring again to FIG. 11, it will be seen that the upper flanges 224 of the end sections 202 of each adjustable stringer 40 overlie the oppositely directed top channel flanges 218 of the channel members 214 and 216 so that the planar continuity of the upper surface of the adjustable stringer as a whole is interrupted by the lower elevation of the top side flanges 218. In order to restore this continuity and also to seal the slot 222 (see FIG. 18) against the entrance of grout, a rubber or other elastomeric sealing strip 270 is provided. Such sealing strip has a rib portion 272 which may be pressed into the slot 222, and also has a flat overlying portion 274 which rests upon the top side flanges 218. The sealing strip 270 may be manufactured as an elongated strip of stock material which is capable of being cut to length to accommodate the various adjustments of the adjustable stringers 40 in the field.

The invention is not to be limited to the exact arrangement of parts shown in the accompanying drawings or described in this specification as various changes in the details of construction may be resorted to without departing from the spirit of the invention. For example, both the nonadjustable stringers 14 and the adjustable stringers 40 of the present invention are useable independently of the system for which they are designed, i.e., the system which is shown and described in aforementioned patent application Serial No. 84,574. When used in the system, the ends of the stringers 14 and 40 while be operatively supported by shore brackets 30 in the manner set forth previously but, when used in other systems, the holes 160 may be omitted and other means provided for supporting the stringers at the upper ends of whatever shore assemblies may be employed for the purpose. The important feature of both the nonadjustable and the adjustable stringers of the present invention is the provision of the vertically shiftable support bars 24 and 44 by means of which panel-removal operations may be effected prior to complete hardening of the concrete slab and without loss of slab support. Therefore, only insofar as the invention has particularly been pointed out in the accompanying claims is the same to be limited.

Having thus described the invention what we claim as new and desire to secure by Letters Patent is:

1. A panel-supporting stringer adapted to be positioned longitudinally in a concrete form installation and to support thereon the side edges of a series of slab-supporting form panels having panel facings disposed in a common horizontal plane and defining a slab-supporting surface, said stringer comprising an elongated I-beam structure having top and bottom flanges and an interconnecting web, and an elongated, substantially horizontally disposed panel-supporting bar slidably mounted on each of the opposite sides of the web for vertical shifting movement bodily between a raised position wherein its upper surface is disposed below the top flange a distance equal to the thickness of a panel, the side edges of which are to be supported on the bar, and a lowered panel-releasing position, and means for locking said bar in its raised position.

2. A panel-supporting stringer as set forth in claim 2 and wherein said panel-supporting bar is in the form of a length of angle stock having a vertical flange and a horizontal flange, said vertical flange being disposed in face-to-face sliding contact with the adjacent side of the web, said horizontal flange projecting laterally away from the web a distance greater than the lateral extent of the overlying top flange of the I-beam.

3. A panel-supporting stringer as set forth in claim 2 and wherein said locking means comprises a fast pin receivable in registering holes provided in the web and horizontal flange, respectively.

4. A panel-supporting stringer as set forth in claim 2 including, additionally, a pin and slot connection between said vertical flange and the web for effecting said sliding face-to-face contact between the same.

5. A panel-supporting stringer as set forth in claim 4 and wherein said pin and slot connection comprises an inclined slot in said web, and a pin carried by and movable bodily with said vertical flange and projecting through said slot.

6. A panel-supporting stringer as set forth in claim 2 and wherein said web is formed with an inclined slot therein, and a nut and bolt assembly carried by said vertical flange, movable bodily therewith and projecting through said slot for clamping said panel-supporting bar in any desired position of vertical adjustment.

7. A panel-supporting stringer as set forth in claim 6 and wherein the locking means comprises a fast pin receivable in registering holes provided in the web and vertical flange, respectively.

8. A sectional stringer adjustable as to length and adapted to be positioned longitudinally in a concrete form installation for supporting thereon a series of slab-supporting form panels having panel facings disposed in a common horizontal plane and defining a slab-supporting surface, said stringer including a medial section in the form of a short length of I-beam stock having top and bottom flanges and an interconnecting web, a pair of elongated channel members having top and bottom flanges and an interconnecting base, said channel members fitting against the opposite sides of said medial section with their bases in face-to-face contact with the web and with their top and bottom flanges underlying and overlying the top and bottom flanges of the medial section, respectively, and in contact therewith, said channel members overhanging the opposite end edges of the medial section with the overhanging portions thereof defining therebetween a pair of oppositely directed open-ended guideways, and stringer end sections in the form of short lengths of I-beam stock having top and bottom flanges and an interconnecting web, said end sections being slidably disposed in said guideways with their web portions in face-to-face sliding contact with the bases of the channel members and with the top and bottom flanges thereof in longitudinal alignment with the top and bottom flanges of the medial stringer section and in sliding contact with the top and bottom channel member flanges, respectively, and means for securing said end sections in any selected position of adjustment within said guideways.

9. A sectional stringer as set forth in claim 8 including, additionally, an elongated, substantially horizontal panel-supporting bar slidably mounted on each of the opposite sides of said medial section and in face-to-face sliding contact with said bases of the channel members, respectively, said bars being independently movable bodily between raised positions wherein they are disposed below the level of the channel top flanges a distance substantially equal to the thickness of a panel to be supported thereon, and a lowered position, and means for securing said bars in their raised position.

10. A sectional stringer as set forth in claim 9 and wherein said securing means comprises a fast pin removably receivable in registering holes provided in the medial stringer section, channel bases and panel-supporting bars, respectively.

11. A sectional stringer as set forth in claim 8 and wherein said securing means comprises a pin and slot connection between the web of each stringer end section and at least one of the adjacent channel bases and including means for drawing the adjacent channel bases toward each other in clamping engagement with the intervening web of the stringer end section.

References Cited in the file of this patent

UNITED STATES PATENTS

| | | |
|---|---|---|
| 1,549,811 | Schissel | Aug. 18, 1925 |
| 1,652,056 | Selway | Dec. 6, 1927 |
| 1,907,707 | Baker | May 9, 1933 |
| 1,942,093 | Goldsmith et al. | Jan. 2, 1934 |
| 2,564,935 | Templeton | Aug. 21, 1951 |
| 2,591,654 | Dean | Apr. 1, 1952 |
| 2,855,654 | Stroben | Oct. 14, 1958 |
| 2,877,875 | Bolt | Mar. 17, 1959 |

FOREIGN PATENTS

| | | |
|---|---|---|
| 750,724 | France | May 29, 1933 |
| 1,207,200 | France | Aug. 31, 1959 |